Sept. 28, 1971 P. Y. GUNN 3,608,240
GREENHOUSE SPACE-SAVING DEVICE
Filed Oct. 1, 1969 2 Sheets-Sheet 1

United States Patent Office 3,608,240
Patented Sept. 28, 1971

3,608,240
GREENHOUSE SPACE-SAVING DEVICE
Poon Yull Gunn, 204 Centre St. S.,
Calgary, Alberta, Canada
Filed Oct. 1, 1969, Ser. No. 862,666
Int. Cl. A01g 9/02
U.S. Cl. 47—58                        4 Claims

ABSTRACT OF THE DISCLOSURE

A method and apparatus for growing plants in stacked trays in a greenhouse. Perforated trays are slanted downwardly in alternate directions, successively. Liquid nutrients supplied to the top tray flow down tier after tier. Alternatively, easy flow is achieved by using a modified form of tray having outwardly and upwardly slanting sides with side holes inclined downwardly and outwardly.

A method and apparatus for successive growing cycles which eliminate soil aeration and cleaning between cycles. A multi-perforated paper layer over the soil is surmounted by a rigid layer having an array of holes defining a plurality of discrete growing locations. Plants are harvested from these locations. Fresh paper and rigid layers replace the first. The discrete growing locations in the second rigid layer are located differently from the first set. Successive rigid layers define different growing locations.

---

This invention relates to a method and an apparatus for growing plants in a greenhouse from seeds planted in soil trays. The invention also relates to a novel soil tray for use in the method and apparatus.

The prior art in this field reveals how to grow plants in a greenhouse from seeds by placing the seeds in soil trays and then stacking the trays one above the other in one or more vertical stacks. In one such apparatus liquid nutrients and water are supplied to the top tray in each vertical stack by a sprinkling system and thence to each subsequent tray in the stack by means of a siphon system. However such prior methods have proven to be less than satisfactory.

The construction of prior art trays did not permit easy flow of liquid nutrients from one level in the vertical stack to the next. Moreover the prior art siphon systems for controlling the flow of liquids were expensive and subject to breakdown or blockage.

According to one feature of my invention, I provide the a simple gravity flow of liquid nutrients and water from one level of the vertical stack to the next. In one embodiment easy flow is achieved by providing holes in the lower side of each tray and by mounting each tray with its bottom slanted downwardly with respect to the horizontal and with the trays in any one stack being slanted in alternate directions, successively, with respect to the horizontal. The liquids are supplied to the four corners of each tray as well as to the center of the top tray in each stack.

In another embodiment, easy liquid flow is achieved by using a modified form of tray having outwardly and upwardly slanting sides with relatively large holes in the side walls adjacent the bottom of the tray and in the bottom adjacent the side walls; and with relatively small holes in the side walls adjacent the top. Preferably these latter holes are inclined downwardly with respect to the horizontal and outwardly. These trays are stacked in the vertical stack with their bottoms parallel to the horizontal.

Another problem associated with prior growing methods has been the necessity of cleaning the soil trays and aerating the soil after each growing cycle, particularly because of weed growth.

Another feature of this invention provides a novel method and apparatus to enable a number of successive growing cycles to be carried out without the necessity of aerating or cleaning between growing cycles. According to the method, seeds are first placed in a plurality of discrete growing locations in at least one soil tray. A first plant growing cycle is carried out in the tray in the greenhouse under controlled growing conditions. The plants are harvested from the tray at the end of the first growing cycle but the roots of the plants just grown are left in the soil. Then seeds are placed in a second plurality of discrete growing locations in the same soil tray, each of second growing locations being different from each of the first growing locations. A second plant growing cycle is carried out in the same tray and these plants are harvested at the end of the growing cycle. It is clear that this sequence can be repeated until substantially all available growing locations are utilized for growing individual plants.

According to the apparatus, first and second pluralities of discrete growing locations for seeds are provided in at least one soil tray, each of the first growing locations being different from each of the second growing locations. Means are provided for carrying out first and second sequential plant growing cycles in the tray in the greenhouse under controlled growing conditions. The tray includes means for enabling the plants to be harvested from it at the end of each growing cycle while leaving the roots of the plants just grown in the soil.

Another feature of my invention is the provision of a novel tray for use in the above-mentioned apparatus and method.

The tray comprises a flat floor and four side walls extending upwardly from the floor to define a chamber for containing a layer of soil. Apertures are provided in the side walls for draining liquids from the soil. A layer of paper having a plurality of needle holes therein is adapted to be placed over the layer of soil. A layer of rigid material is adapted to be placed over the paper layer. The rigid layer has an array of holes therethrough defining a plurality of discrete growing locations. The apertures in the rigid layer are large enough to allow the stalk of a plant to grow therethrough from seeds placed on the paper layer through the apertures.

As will become more evident hereinafter my invention provides the additional advantages of minimizing water evaporation in the soil and erosion of the soil; enhancing fertilization of the soil by leaving old roots in the soil between growing cycles; and providing weed control.

Preferred embodiments of my invention will now be described by way of example with reference to the accompanying drawings in which.

Figure 1:
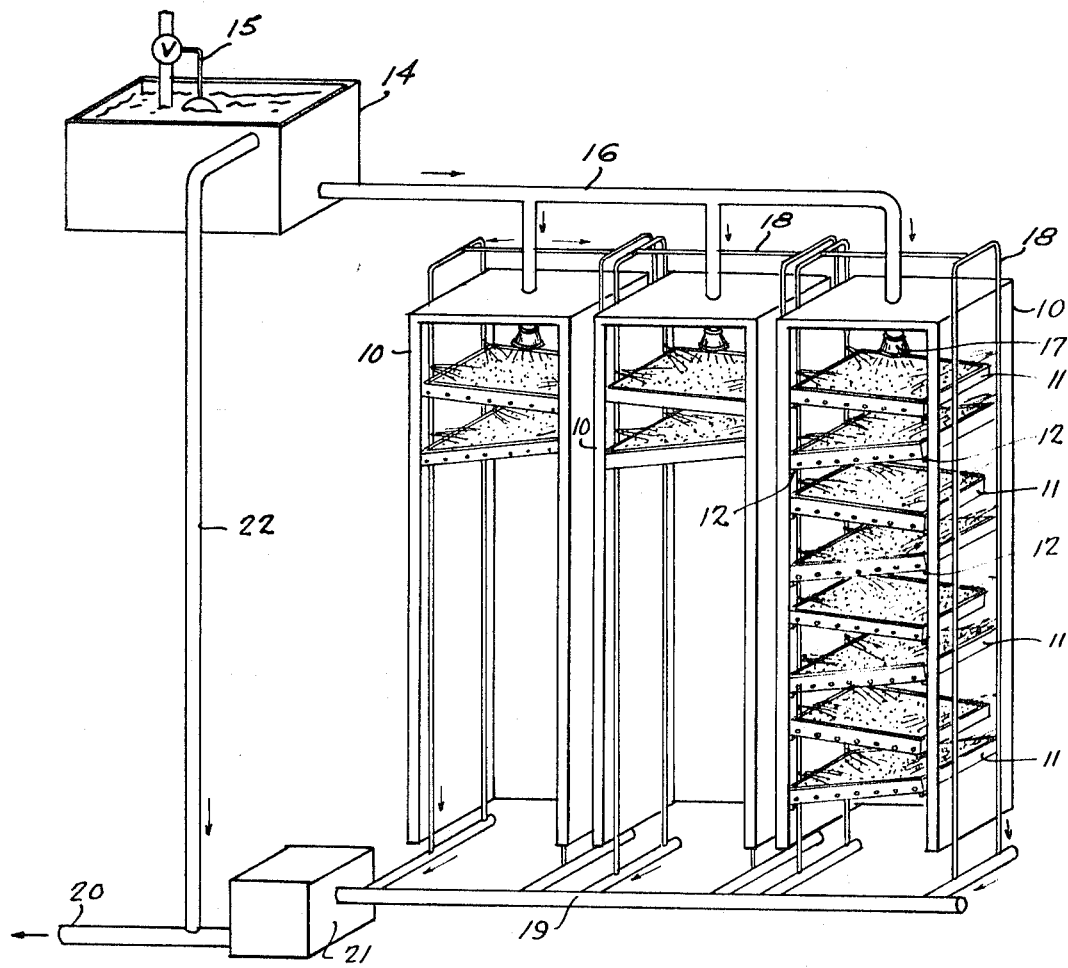
FIG. 1 is a perspective view showing the interior of a greenhouse (with superstructure removed) and housing the apparatus of my invention.

Reference first will be made to the overall apparatus contained in the greenhouse as depicted in FIG. 1. A number of hollow vertically oriented, rectangular shaped frameworks 10 are placed side by side in a greenhouse to define a chamber for housing soil trays 11. Means are provided, shown as brackets 12, for mounting the trays 11 in a vertical stack with the trays being spaced closely apart. A typical spacing would be two inches but the spacing would vary depending on the type of plant to be grown. Each tray 11 has a flat bottom, perpendicular walls and drainage holes in its side walls adjacent its bottom. The brackets 12 are arranged to mount each tray 11 with its bottom inclined downwardly with respect to the horizontal, with the trays in any one stack being slanted in alternate directions, successively, with respect to the horizontal. The purpose of this arrangement will be explained below.

A reservoir 14 containing a float 15 feeds liquid nutrient and water via pipes 16 to showerheads 17 located immediately above the center of the top tray 11 of the tiers in each framework 10. Subsidiary pipes 18 feed from the main pipes 16 and provide liquid to the four corners of each tray in the stack. The pipes 18 extend vertically down two sides of the framework 10 and join outlet pipes 19, the excess liquids being fed to a drain 20 through a pump 21. An overflow pipe 22 connects the reservoir 14 to the drain 20. Although not shown, the bottom of each framework would be perforated to allow waste liquids to drain from the bottom tray 11 into the ground. If desired, these liquids could be filtered and recirculated to the reservoir 14 by means of a pump.

It has been found satisfactory to sprinkle water having a temperature of between 60° and 100° F. on the top tray 11 for a period of 15 minutes once every three hours. However, these sprinkling periods can be varied to suit the requirements of the particular type of plant to be grown. A thermostat (not shown) can be used to control the temperature of the liquid in the reservoir 14. The air temperature in the greenhouse can be controlled by another thermostat, and carbon dioxide gas can be circulated through the greenhouse in the well known manner. Many kinds of plants can be grown from seeds using my invention such as lettuce, celery, radishes, parsley, etc.

Figure 2:
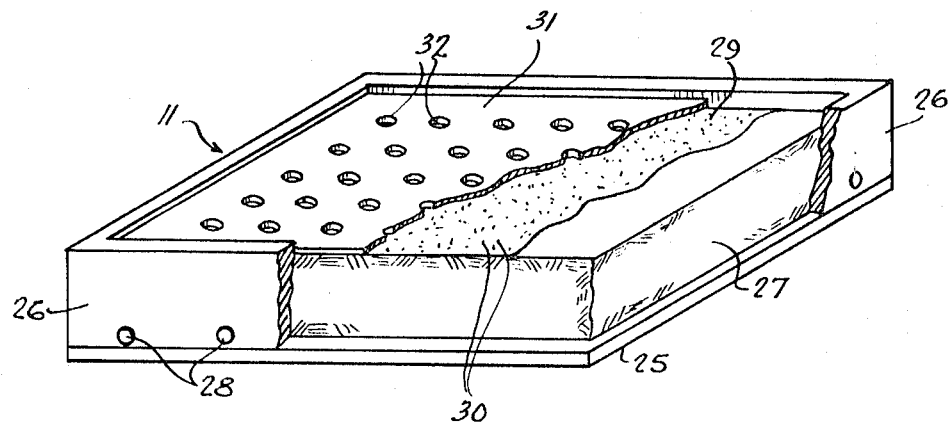
FIG. 2 is a perspective view of a soil tray, according to one embodiment of my invention, with parts broken away for clarity.

Reference will now be made to FIG. 2 where a soil tray 11 is shown in more detail. The tray is of generally rectangular shape and comprises a floor 25, and side walls 26 extending perpendicularly upwardly from the floor 25 to define a chamber for containing a layer of soil 27. The tray also contains apertures 28 in its side walls 26 adjacent the floor 25 for draining liquids from the soil. A layer of paper 29 having a plurality of needle holes 30 therein is adapted to be placed over the layer 27 of soil prior to carrying out a plant growing cycle. This layer of paper 29 enhances the retention of moisture in the soil; minimizes erosion by water; prevents the flow of liquid from carrying the seeds away from the soil; and helps to control weed growth. The weight of the paper is slight enough that the plants can easily break through the holes 30 as they grow (see FIG. 3). The essential characteristics of the paper layer 29 are absorption of liquids, while allowing evaporation; ease of penetration by plant growing power; and small expense. The presence of the holes 30 enhances the ability of the liquid to enter the soil.

A layer 31 of rigid material having an array of holes 32 therethrough is adapted to be placed over the paper layer 29 prior to carrying out a plant growing cycle. The rigid layer 31 is preferably made of plywood or some other building material. Its essential characteristics are rigidity and capability of being re-used several times. The thickness of the layer 31 is not critical other than to provide rigidity. The holes 32 must be of a size such as to allow the stalk of a plant to grow therethrough from seeds placed on the paper layer 29 and to give some support to the stalks. The holes 32 must be spaced in such a way as to space the stalks of growing plants sufficiently far apart from one another. As will be explained below, the rigidity of the layer 31 also facilitates harvesting of the plants. The depth of the trays 11 can be varied depending on the type of the plant to be grown.

Figure 5:
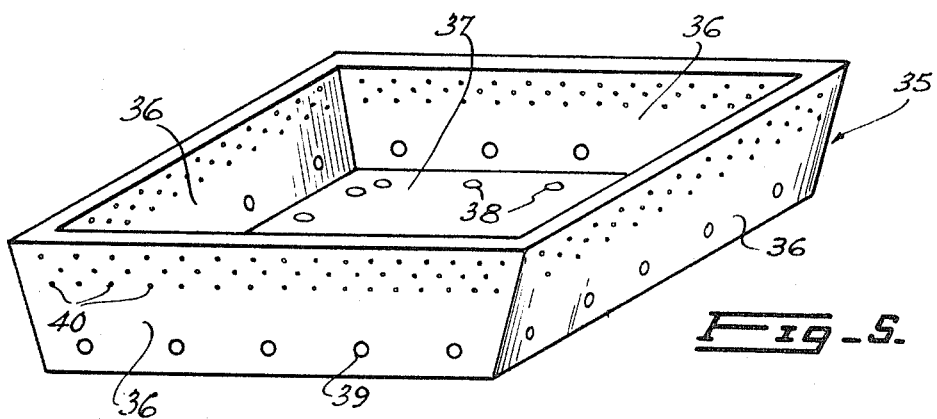
FIG. 5 is a modified form of tray with soil and layers removed.

A modified form of tray 35 is shown in FIG. 5. In this tray the side walls 36 are inclined upwardly and outwardly from the floor 37. The floor 37 contains an array of holes 38 adjacent the walls 36 and the walls 36 contain an array of similar holes 39 adjacent the floor 37. The walls also contain a concentrated array of smaller holes 40 near the top of the tray 35. These smaller holes 40 are inclined downwardly and outwardly with respect to the horizontal to improve drainage.

Because of the manner in which the walls 36 are inclined and the manner in which the apertures 38-40 are provided in the trays 35, these trays can be placed in the vertical stacks in the framework 10 of FIG. 1 with their floors 37 parallel to the horizontal and still achieve good results of liquid gravity flow from one level to the next. The holes 40 can be inclined as much as 75 degrees to the horizontal.

The trays 11 and 35 can be constructed of various materials such as perforated plastic board, screen, or metal, and supported by a framework when necessary.

Figure 4A:
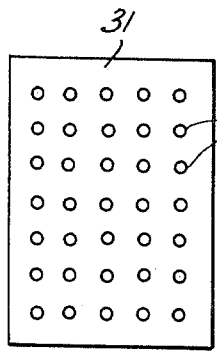
FIGS. 4a to 4c show three rigid layers for use in the tray of FIG. 2 during successive plant growing cycles.
Figure 4B:
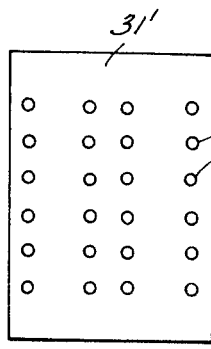
Figure 4C:
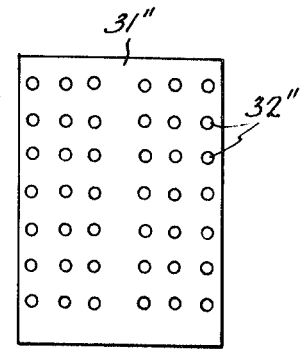

FIGS. 4a and 4c respectively show three typical rigid layers 31, 31′ and 31″ that can be used during different plant growing cycles. It should be noted that the holes 32 of layer 31 define a first plurality of discrete plant growing locations. Similarly, the holes 32′ and 32″ of layers 31′ and 31″ respectively define second and third discrete plant growing locations. The important feature of these layers is that each of the plurality of plant growing locations defined by the holes 32, 32′ and 32″ is different from every other location. It is clear that more than three layers 31 can be provided for producing still further pluralities of discrete plant growing locations.

Figure 3:
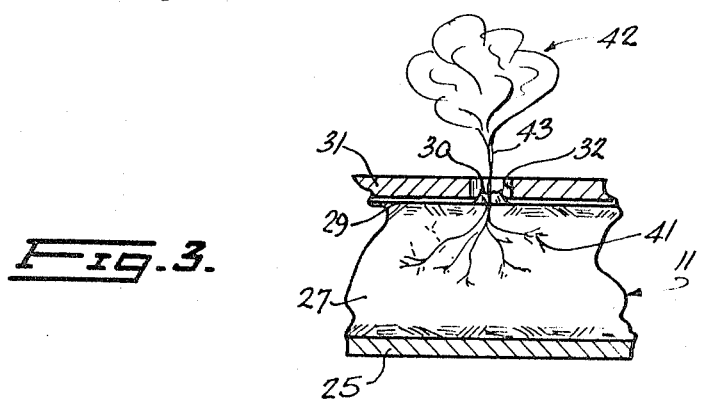
FIG. 3 is a sectional view of a single plant growing location in the tray of FIG. 2.

The method of operation of the invention will now be described with reference to FIGS. 1 to 4. Each tray 11 in which plants are to be grown is filled with soil 27 to 80 or 90% capacity. A paper layer 29 is then placed over the soil 27, with the first rigid layer 31 (FIG. 4a) placed over the layer 29. Each tray 11 will then appear as shown in FIG. 2. Seeds of the plants to be grown are dropped into the holes 32 of the layer 31 and will rest on the paper layer 29. To ensure that the seeds reach the soil beneath the paper layer 29, a sharp pointed tool can be passed through the holes 32 to puncture the paper and to urge the seeds into the soil. The trays 11, thus loaded, are placed in the greenhouse on the brackets 12 in the frameworks 10 in the manner shown in FIG. 1. A plant growing cycle is then carried out in the greenhouse under conventional controlled growing conditions. As shown in FIG. 3, the roots 41 of the plant 42 grow downwards into the soil 27, while the stalk 43 of the plant 42 pushes through the holes 30 in the paper layer 29 and grows through the holes 32 in the rigid layer 31.

At the end of the first plant growing cycle, the plants are readily harvested by passing a shovel knife along the upper surface of the layer 31. This layer and the paper layer 29 are then removed, but the roots 41 of the plants are left in the soil to serve as fertilizer. Removal of the layers 29 and 31 effectively removes all unnecessary vegetable matter. The presence of the layers 29 and 31 prevents weeds from growing where there are no holes and therefore the tray does not have to be cleaned and aerated. Weeds cannot grow because they do not receive light or air and because no weed seeds can be introduced into the tray. Should there be weeds already in the soil, they will not grow out of the tray because of lack of light and air and because the presence of the rigid layer 31 would prevent the weeds from reaching the surface.

A new paper layer 29 is then placed over the soil 27 and the second rigid layer 31′ (FIG. 4b) is placed over this new paper layer. Seeds are dropped into the holes 32′ of the layer 31′ as before. It can be seen that a second plurality of discrete plant growing locations has now been provided. A second plant growing cycle is then carried out under controlled growing conditions as before. The controlled spacing provided by the layers 31 and 31′ ensures that the roots of the previous growth cycle will not interfere with the new plants, and also affords the new plants ample growing space.

At the end of this second cycle, the new plants are harvested as before but the roots of the plants from both the first and second growing cycles are left in the soil. In a similar manner, a third growing cycle can be carried out using a new paper layer 29 and rigid layer 31″ (FIG. 4c). Still further growing cycles can be carried out until all possible plant growing locations in the tray have been used.

What I claim is:

1. A method of growing plants in a greenhouse from seeds in soil trays in which each soil tray can be used for at least two growing cycles without the necessity of cleaning the trays or aerating the soil comprising the steps of:
   (a) placing seeds in a plurality of discrete growing locations in at least one soil tray;
   (b) carrying out a first plant growing cycle in the tray in the greenhouse under controlled growing conditions;
   (c) harvesting plants from the tray at the end of the first growing cycle while leaving the roots of the plants just grown in the soil;
   (d) placing seeds in a second plurality of discrete growing locations in the same soil tray, each of the second growing locations being different from each of the first growing locations;
   (e) carrying out a second plant growing cycle in the tray in the greenhouse under controlled growing conditions; and
   (f) harvesting plants from the tray at the end of the second growing cycle.

2. A method as defined in claim 1 wherein the roots of the plants are left in the soil from the first and second growing cycles, and repeating steps (d), (e) and (f) for further discrete plant growing locations in the same soil tray, each said further growing location being different from each of said first and second growing locations until all the available growing locations are utilized for growing individual plants.

3. A method as defined in claim 1 wherein step (a) comprises
   (i) partially filling the tray with soil;
   (ii) placing a first layer of paper having a plurality of needle holes therein over the soil;
   (iii) placing a first layer of rigid material over the paper layer, the rigid layer having an array of holes therethrough defining the first growing locations; and
   (iv) placing seeds in the holes of the rigid layer.

4. A method as defined in claim 3 wherein steps (c), (d), and (f) comprise:
   (v) cutting off the plants at the upper surface of the rigid layer;
   (vi) removing the rigid and paper layers from the tray;
   (vii) placing a second layer of paper having a plurality of holes therein over the soil;
   (viii) placing a second layer of rigid material over the second paper layer, the second rigid layer having an array of holes therethrough defining the second growing locations;
   (ix) placing seeds in the holes of the second rigid layer; and
   (x) cutting off the plants at the upper surface of the second rigid layer after step (e) has been completed.

References Cited
UNITED STATES PATENTS 2,928,211   3/1960   Martin _____ 47—1.2
3,365,840   1/1968   Cooper _____ 47—34.12

ROBERT E. BAGWILL, Primary Examiner

U.S. Cl. X.R.
47—34, 34.12, 39